(12) United States Patent
Newnham et al.

(10) Patent No.: US 11,243,733 B2
(45) Date of Patent: Feb. 8, 2022

(54) SYSTEM AND METHOD FOR PROVIDING ACCESS TO CO-LOCATED OPERATIONS DATA FOR AN ELECTRONIC DISPLAY

(71) Applicant: Manufacturing Resources International, Inc., Alpharetta, GA (US)

(72) Inventors: Elliot Newnham, Alpharetta, GA (US); Brock Bearchell, Alpharetta, GA (US)

(73) Assignee: Manufacturing Resources International, Inc., Alpharetta, GA (US)

( * ) Notice: Subject to any disclaimer, the term of this patent is extended or adjusted under 35 U.S.C. 154(b) by 0 days.

(21) Appl. No.: 17/134,634

(22) Filed: Dec. 28, 2020

(65) Prior Publication Data

US 2021/0117143 A1 Apr. 22, 2021

Related U.S. Application Data

(63) Continuation of application No. 16/508,877, filed on Jul. 11, 2019, now Pat. No. 10,908,863.
(Continued)

(51) Int. Cl.
*G06F 3/14* (2006.01)
*H04L 12/26* (2006.01)

(52) U.S. Cl.
CPC ............... *G06F 3/14* (2013.01); *H04L 43/06* (2013.01)

(58) Field of Classification Search
CPC .... G06F 3/04883; G06F 3/04845; G06F 3/14; G06K 9/222; H04L 43/06
(Continued)

(56) References Cited

U.S. PATENT DOCUMENTS 5,162,785 A 11/1992 Fagard
5,351,201 A 9/1994 Harshbarger, Jr. et al.
(Continued)

FOREIGN PATENT DOCUMENTS

AU 2016321400 B2 9/2019
CN 203277867 U 11/2013
(Continued)

OTHER PUBLICATIONS

Photo Research, PR-650 SpectaScan Colorimeter, 1999, 2 Pages.
(Continued)

*Primary Examiner* — Mark Edwards
(74) *Attorney, Agent, or Firm* — Standley Law Group LLP; Jeffrey S. Standley; Adam J. Smith

(57) ABSTRACT

Systems and methods for providing access to co-located operations data for one or more electronic display assemblies for a number of different clients are provided. Client identifiers are assigned to operations data received at one or more databases from sensors at the electronic display assemblies. In some embodiments, portions of the operations data from a certain electronic display assembly are assigned different client identifiers. In other embodiments, all operations data from a given electronic display assembly are assigned the same client identifier. The operations data is electronically partitioned by assigned client identifier. Upon request, operations data is retrieved for a given client identifier and transmitted to a requesting client device.

18 Claims, 11 Drawing Sheets

Related U.S. Application Data

(60) Provisional application No. 62/697,016, filed on Jul. 12, 2018.

(58) Field of Classification Search
USPC .......................................................... 345/2.1
See application file for complete search history.

(56) References Cited

U.S. PATENT DOCUMENTS

| | | | |
|---|---|---|---|
| 5,590,831 | A | 1/1997 | Manson et al. |
| 5,751,346 | A | 5/1998 | Dozier et al. |
| 5,786,801 | A | 7/1998 | Ichise |
| 5,952,992 | A | 9/1999 | Helms |
| 6,144,359 | A | 11/2000 | Grave |
| 6,157,143 | A | 12/2000 | Bigio et al. |
| 6,215,411 | B1 | 4/2001 | Gothard |
| 6,222,841 | B1 | 4/2001 | Taniguchi |
| 6,259,492 | B1 | 7/2001 | Imoto et al. |
| 6,384,736 | B1 | 5/2002 | Gothard |
| 6,421,694 | B1 | 7/2002 | Nawaz et al. |
| 6,509,911 | B1 | 1/2003 | Shimotono |
| 6,546,294 | B1 | 4/2003 | Kelsey et al. |
| 6,553,336 | B1 | 4/2003 | Johnson et al. |
| 6,556,258 | B1 | 4/2003 | Yoshida et al. |
| 6,587,525 | B2 | 7/2003 | Jeong et al. |
| 6,701,143 | B1 | 3/2004 | Dukach et al. |
| 6,753,842 | B1 | 6/2004 | Williams et al. |
| 6,771,795 | B1 | 8/2004 | Isnardi |
| 6,812,851 | B1 | 11/2004 | Dukach et al. |
| 6,850,209 | B2 | 2/2005 | Mankins et al. |
| 6,968,375 | B1 | 11/2005 | Brown |
| 7,038,186 | B2 | 5/2006 | De Brabander et al. |
| 7,064,672 | B2 | 6/2006 | Gothard |
| 7,319,862 | B1 | 1/2008 | Lincoln et al. |
| 7,330,002 | B2 | 2/2008 | Joung |
| 7,369,058 | B2 | 5/2008 | Gothard |
| 7,380,265 | B2 | 5/2008 | Jensen et al. |
| 7,391,317 | B2 | 6/2008 | Abraham et al. |
| 7,451,332 | B2 | 11/2008 | Culbert et al. |
| 7,474,294 | B2 | 1/2009 | Leo et al. |
| 7,577,458 | B2 | 8/2009 | Lin |
| 7,581,094 | B1 | 8/2009 | Apostolopoulos et al. |
| 7,595,785 | B2 | 9/2009 | Jang |
| 7,612,278 | B2 | 11/2009 | Sitrick et al. |
| 7,614,065 | B2 | 11/2009 | Weissmueller, Jr. et al. |
| 7,636,927 | B2 | 12/2009 | Zigmond et al. |
| 7,675,862 | B2 | 3/2010 | Pham et al. |
| 7,751,813 | B2 | 7/2010 | Varanda |
| 7,764,280 | B2 | 7/2010 | Shiina |
| 7,774,633 | B1 | 8/2010 | Harrenstien et al. |
| 7,795,821 | B2 | 9/2010 | Jun |
| 7,949,893 | B1 | 5/2011 | Knaus et al. |
| 8,212,921 | B2 | 7/2012 | Yun |
| 8,218,812 | B2 | 7/2012 | Sugimoto et al. |
| 8,248,203 | B2 | 8/2012 | Hanwright et al. |
| 8,441,574 | B2 | 5/2013 | Dunn et al. |
| 8,601,252 | B2 | 12/2013 | Mendelow et al. |
| 8,654,302 | B2 | 2/2014 | Dunn et al. |
| 8,689,343 | B2 | 4/2014 | De Laet |
| 8,767,165 | B2 | 7/2014 | Dunn |
| 8,854,595 | B2 | 10/2014 | Dunn |
| 8,983,385 | B2 | 3/2015 | Macholz |
| 9,026,686 | B2 | 5/2015 | Dunn et al. |
| 9,812,047 | B2 | 11/2017 | Schuch et al. |
| 10,120,498 | B2 | 11/2018 | Gray |
| 10,296,108 | B2 | 5/2019 | Gray et al. |
| 10,325,536 | B2 | 6/2019 | Schuch et al. |
| 10,353,785 | B2 | 7/2019 | Dunn et al. |
| 10,593,175 | B1 * | 3/2020 | Jennings .......... G08B 13/19656 |
| 2002/0019933 | A1 | 2/2002 | Friedman et al. |
| 2002/0026354 | A1 | 2/2002 | Shoji et al. |
| 2002/0065046 | A1 | 5/2002 | Mankins et al. |
| 2002/0112026 | A1 | 8/2002 | Fridman et al. |
| 2002/0120721 | A1 | 8/2002 | Eilers et al. |
| 2002/0147648 | A1 | 10/2002 | Fadden et al. |
| 2002/0152425 | A1 | 10/2002 | Chaiken et al. |
| 2002/0163513 | A1 | 11/2002 | Tsuji |
| 2002/0163916 | A1 | 11/2002 | Oskouy et al. |
| 2002/0164962 | A1 | 11/2002 | Mankins et al. |
| 2002/0190972 | A1 | 12/2002 | Ven de Van |
| 2002/0194365 | A1 | 12/2002 | Jammes |
| 2002/0194609 | A1 | 12/2002 | Tran |
| 2003/0031128 | A1 | 2/2003 | Kim et al. |
| 2003/0039312 | A1 | 2/2003 | Horowitz et al. |
| 2003/0061316 | A1 | 3/2003 | Blair et al. |
| 2003/0097497 | A1 | 5/2003 | Esakov |
| 2003/0098881 | A1 | 5/2003 | Nolte et al. |
| 2003/0115591 | A1 | 6/2003 | Weissmueller, Jr. et al. |
| 2003/0117714 | A1 | 6/2003 | Nakamura et al. |
| 2003/0161354 | A1 | 8/2003 | Bader et al. |
| 2003/0177269 | A1 | 9/2003 | Robinson et al. |
| 2003/0192060 | A1 | 10/2003 | Levy |
| 2003/0196208 | A1 | 10/2003 | Jacobson |
| 2003/0214242 | A1 | 11/2003 | Berg-johansen |
| 2003/0230991 | A1 | 12/2003 | Muthu et al. |
| 2004/0036697 | A1 | 2/2004 | Kim et al. |
| 2004/0138840 | A1 | 7/2004 | Wolfe |
| 2004/0158872 | A1 | 8/2004 | Kobayashi |
| 2004/0194131 | A1 | 9/2004 | Ellis et al. |
| 2004/0243940 | A1 | 12/2004 | Lee et al. |
| 2004/0252400 | A1 | 12/2004 | Blank et al. |
| 2004/0253947 | A1 | 12/2004 | Phillips et al. |
| 2005/0033840 | A1 | 2/2005 | Nisani et al. |
| 2005/0070335 | A1 | 3/2005 | Jitsuishi et al. |
| 2005/0071252 | A1 | 3/2005 | Henning et al. |
| 2005/0073518 | A1 | 4/2005 | Bontempi |
| 2005/0088984 | A1 | 4/2005 | Chin et al. |
| 2005/0123001 | A1 | 6/2005 | Craven et al. |
| 2005/0132036 | A1 | 6/2005 | Jang et al. |
| 2005/0179554 | A1 | 8/2005 | Lu |
| 2005/0184983 | A1 | 8/2005 | Brabander et al. |
| 2005/0216939 | A1 | 9/2005 | Corbin |
| 2005/0231457 | A1 | 10/2005 | Yamamoto et al. |
| 2005/0267943 | A1 | 12/2005 | Castaldi et al. |
| 2005/0289061 | A1 | 12/2005 | Kulakowski et al. |
| 2005/0289588 | A1 | 12/2005 | Kinnear |
| 2006/0007107 | A1 | 1/2006 | Ferguson |
| 2006/0022616 | A1 | 2/2006 | Furukawa et al. |
| 2006/0150222 | A1 | 7/2006 | McCafferty et al. |
| 2006/0160614 | A1 | 7/2006 | Walker et al. |
| 2006/0269216 | A1 | 11/2006 | Wiemeyer et al. |
| 2007/0039028 | A1 | 2/2007 | Bar |
| 2007/0154060 | A1 | 7/2007 | Sun |
| 2007/0157260 | A1 | 7/2007 | Walker |
| 2007/0168539 | A1 | 7/2007 | Day |
| 2007/0200513 | A1 | 8/2007 | Ha et al. |
| 2007/0214812 | A1 | 9/2007 | Wagner et al. |
| 2007/0237636 | A1 | 10/2007 | Hsu |
| 2007/0268241 | A1 | 11/2007 | Nitta et al. |
| 2007/0273519 | A1 | 11/2007 | Ichikawa et al. |
| 2007/0274400 | A1 | 11/2007 | Murai et al. |
| 2007/0286107 | A1 | 12/2007 | Singh et al. |
| 2007/0291198 | A1 | 12/2007 | Shen |
| 2008/0008471 | A1 | 1/2008 | Dress |
| 2008/0019147 | A1 | 1/2008 | Erchak et al. |
| 2008/0024268 | A1 | 1/2008 | Wong et al. |
| 2008/0034205 | A1 | 2/2008 | Alain et al. |
| 2008/0037466 | A1 | 2/2008 | Ngo et al. |
| 2008/0037783 | A1 | 2/2008 | Kim et al. |
| 2008/0055297 | A1 | 3/2008 | Park |
| 2008/0096559 | A1 | 4/2008 | Phillips et al. |
| 2008/0104631 | A1 | 5/2008 | Krock et al. |
| 2008/0111958 | A1 | 5/2008 | Kleverman et al. |
| 2008/0112601 | A1 | 5/2008 | Warp |
| 2008/0136770 | A1 | 6/2008 | Peker et al. |
| 2008/0163291 | A1 | 7/2008 | Fishman et al. |
| 2008/0185976 | A1 | 8/2008 | Dickey et al. |
| 2008/0218501 | A1 | 9/2008 | Diamond |
| 2008/0246871 | A1 | 10/2008 | Kupper et al. |
| 2008/0266554 | A1 | 10/2008 | Sekine et al. |
| 2008/0267328 | A1 | 10/2008 | Ianni et al. |
| 2008/0278099 | A1 | 11/2008 | Bergfors et al. |
| 2008/0281165 | A1 | 11/2008 | Rai et al. |
| 2008/0303918 | A1 | 12/2008 | Keithley |

(56) References Cited

U.S. PATENT DOCUMENTS

| | | |
|---|---|---|
| 2008/0313691 A1 | 12/2008 | Cholas et al. |
| 2009/0009997 A1 | 1/2009 | Sanfilippo et al. |
| 2009/0015400 A1 | 1/2009 | Breed |
| 2009/0036190 A1 | 2/2009 | Brosnan et al. |
| 2009/0079416 A1 | 3/2009 | Vinden et al. |
| 2009/0104989 A1 | 4/2009 | Williams et al. |
| 2009/0129556 A1 | 5/2009 | Ahn |
| 2009/0152445 A1 | 6/2009 | Gardner, Jr. |
| 2009/0164615 A1 | 6/2009 | Akkanen |
| 2009/0273568 A1 | 11/2009 | Milner |
| 2009/0315867 A1 | 12/2009 | Sakamoto et al. |
| 2010/0017526 A1 | 1/2010 | Jagannath et al. |
| 2010/0037274 A1 | 2/2010 | Meuninck et al. |
| 2010/0060550 A1 | 3/2010 | McGinn et al. |
| 2010/0083305 A1 | 4/2010 | Acharya et al. |
| 2010/0149567 A1 | 6/2010 | Kanazawa et al. |
| 2010/0177157 A1 | 7/2010 | Stephens et al. |
| 2010/0177158 A1 | 7/2010 | Walter |
| 2010/0177750 A1 | 7/2010 | Essinger et al. |
| 2010/0198983 A1 | 8/2010 | Monroe et al. |
| 2010/0226091 A1 | 9/2010 | Dunn |
| 2010/0231563 A1 | 9/2010 | Dunn et al. |
| 2010/0237697 A1 | 9/2010 | Dunn et al. |
| 2010/0238299 A1 | 9/2010 | Dunn et al. |
| 2010/0299556 A1 | 11/2010 | Taylor et al. |
| 2011/0019636 A1 | 1/2011 | Fukuoka et al. |
| 2011/0047567 A1 | 2/2011 | Zigmond et al. |
| 2011/0078536 A1 | 3/2011 | Han et al. |
| 2011/0283199 A1* | 11/2011 | Schuch .................. G09G 5/003 715/740 |
| 2012/0105424 A1 | 5/2012 | Lee et al. |
| 2012/0203872 A1 | 8/2012 | Luby et al. |
| 2012/0302343 A1 | 11/2012 | Hurst et al. |
| 2012/0308191 A1 | 12/2012 | Chung et al. |
| 2013/0162908 A1 | 6/2013 | Son et al. |
| 2013/0173358 A1 | 7/2013 | Pinkus |
| 2014/0002747 A1 | 1/2014 | Macholz |
| 2015/0193074 A1 | 7/2015 | Cudak et al. |
| 2015/0250021 A1 | 9/2015 | Stice et al. |
| 2016/0034240 A1 | 2/2016 | Kreiner et al. |
| 2017/0075777 A1 | 3/2017 | Dunn et al. |
| 2017/0163519 A1 | 6/2017 | Bowers et al. |
| 2017/0242502 A1 | 8/2017 | Gray et al. |
| 2017/0242534 A1 | 8/2017 | Gray |
| 2017/0256051 A1 | 9/2017 | Dwivedi et al. |
| 2017/0315886 A1 | 11/2017 | Helmick et al. |
| 2018/0061297 A1 | 3/2018 | Schuch et al. |
| 2018/0181091 A1* | 6/2018 | Funk ...................... G08G 1/095 |
| 2018/0268783 A1 | 9/2018 | Woo |
| 2018/0364858 A1 | 12/2018 | Gray |
| 2018/0364859 A1 | 12/2018 | Gray |
| 2018/0364860 A1 | 12/2018 | Gray |
| 2018/0364861 A1 | 12/2018 | Gray |
| 2019/0087042 A1 | 3/2019 | Van Ostrand et al. |
| 2019/0171331 A1 | 6/2019 | Gray et al. |
| 2019/0258552 A1 | 8/2019 | Dunn et al. |
| 2020/0019363 A1 | 1/2020 | Newnham et al. |
| 2020/0272269 A1 | 8/2020 | Dunn |

FOREIGN PATENT DOCUMENTS

| | | |
|---|---|---|
| EP | 0313331 B1 | 2/1994 |
| EP | 1821538 A1 | 8/2007 |
| EP | 2351369 A2 | 8/2011 |
| EP | 2396964 A2 | 12/2011 |
| EP | 3347793 A1 | 7/2018 |
| JP | 61-234690 A | 10/1986 |
| JP | 61-251901 A | 11/1986 |
| JP | 7-74224 A | 3/1995 |
| JP | 2000122575 A | 4/2000 |
| JP | 2002064842 A | 2/2002 |
| JP | 2002209230 A | 7/2002 |
| JP | 2005-211449 A | 8/2005 |
| JP | 2005-211451 A | 8/2005 |
| JP | 2005236469 A | 9/2005 |
| JP | 2005333568 A | 12/2005 |
| JP | 2010282109 A | 12/2010 |
| JP | 2018537876 A | 12/2018 |
| JP | 6639653 B2 | 1/2020 |
| KR | 10-2010-0081354 A | 7/2010 |
| KR | 10-2011-0065338 A | 6/2011 |
| KR | 10-2056069 B1 | 12/2019 |
| WO | WO9608892 A1 | 3/1996 |
| WO | 2008050402 A1 | 5/2008 |
| WO | WO2011106683 | 9/2011 |
| WO | WO2012/127971 A1 | 9/2012 |
| WO | WO2017044952 A1 | 3/2017 |
| WO | WO2020/176416 A1 | 9/2020 |

OTHER PUBLICATIONS

Texas Advanced Optoelectronic Solutions, TCS230 Programmable Color Light-To-Frequency Converter, 2007, 12 Pages.

Don Methven, Wireless Video Streaming: An Overview, Nov. 16, 2002, 7 Pages.

Outdoorlink, Inc., SmartLink One, One Relay, http://smartlinkcontrol.com/billboard/one-relay/, retrieved Apr. 17, 2019, 2007-16, 6 pages.

Outdoorlink, Inc., SmartLink Website User Manual, http://smartlink.outdoorlinkinc.com/docs/SmartLinkWebsiteUserManual.pdf, 2017, 33 pages.

Outdoorlink, Inc., SmartLink One Out of Home Media Controller, 2016, 1 page.

Sigmasense, Analog can't touch Digital homepage, Jan. 23, 2019, 5 pages.

Jim Tuley, EEJournal—SigmaSence ICCI Goes Big, article, Jan. 8, 2019, 3 pages.

Sigmasense, Solutions webpage, Jan. 23, 2019, 4 pages.

Sigmasense, Technology webpage, Jan. 23, 2019, 3 pages.

\* cited by examiner

Figure 7

SYSTEM AND METHOD FOR PROVIDING ACCESS TO CO-LOCATED OPERATIONS DATA FOR AN ELECTRONIC DISPLAY

CROSS-REFERENCE TO RELATED APPLICATION

This application is a continuation of U.S. application Ser. No. 16/508,877 filed Jul. 11, 2019, which claims the benefit of U.S. Provisional Application No. 62/697,016 filed Jul. 12, 2018, the disclosure of each of which are hereby incorporated by reference as if fully restated herein.

TECHNICAL FIELD

Exemplary embodiments relate generally to a system and method for providing access to co-located operations data, particularly with regards to operation of one or more electronic display assemblies.

BACKGROUND AND SUMMARY OF THE INVENTION

The use of electronic displays has increased in recent years. Beyond personal use, these electronic displays are sometimes placed in an enclosure, which may be ruggedized, for both indoor and/or outdoor use. For example, without limitation, such display assemblies may be placed outdoors, such as on sidewalks or on the tops of vehicles to name some examples, to display advertisements or other information. Oftentimes these display assemblies are associated with other electronic equipment to provide features such as, but not limited to, video conferencing, web browsing, way finding, image capture, emergency notification, and the like. It is desirable to provide owners, manufactures, operators, renters, or the like of such display assemblies with access to operations data regarding the status and operation of such display assemblies. Furthermore, these display assemblies consume a significant amount of power during operation. A significant amount of the energy consumption of such display assemblies comes from operation of the backlight. Particularly as the use of such display assemblies has increased, it is desirable that such operations data include data regarding the energy consumption of the display, including but not limited to, status and operation of the backlight. Such operations data may be stored and presented to display owners and other relevant parties such that energy consumption and reliability may be tracked. Certain operations parameters may be adjusted in response to the presented data. For example, without limitation, backlight levels may be adjusted downward to reduce energy consumption or maintenance frequencies may be increased in response to reported display assembly downtime.

However, for many such display assemblies, multiple parties may have an interest in the operations data. For example, a display assembly manufacturer may have an interest in monitoring its tens, hundreds, thousands, tens of thousands, etc. of display assemblies. Each owner or renter of one or more such display assemblies might likewise have an interest in monitoring the display assemblies it owns. While the manufacturer may already have access to this operations data, the operations data may include data for all owners or renters. Thus, the operations data may be co-located with operations data for other owners or renters. Allowing complete access to such data may create privacy concerns. However, individual storage of each client's information would potentially require multiple storage devices, increasing complexity and expense. Therefore, what is needed is a system and method for providing access to co-located operations data for a display assembly.

The present disclosures provide a system and method for providing access to co-located operations data for a display assembly. The system may comprise one or more client devices in communication with a centralized monitoring center via a network. Multiple display assemblies may likewise be in communication with the monitoring center via the network. In exemplary embodiments, each display assembly comprises one or more electronic displays and other electronic components for operation of the display assembly in electrical connection with a display controller. The display controller may likewise be in electrical connection with a network interface device. The network interface device may likewise be in communication with the centralized monitoring center via the network.

Operations data may be continually gathered and transmitted to the central monitoring center for storage. The received operations data may be processed. Such processing may determine which client(s) are associated with the operations data and what the operations data represents. The operations data may be summarized and presented in a visual depiction. Upon receipt of a client request for operations information, client specific information may be retrieved and presented to the client in the visual depiction. In other exemplary embodiments, upon login, a client may be permitted to remotely operate or modify display assemblies associated with the client.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 7 is an exemplary user interface for use with the system of FIG. 1;

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
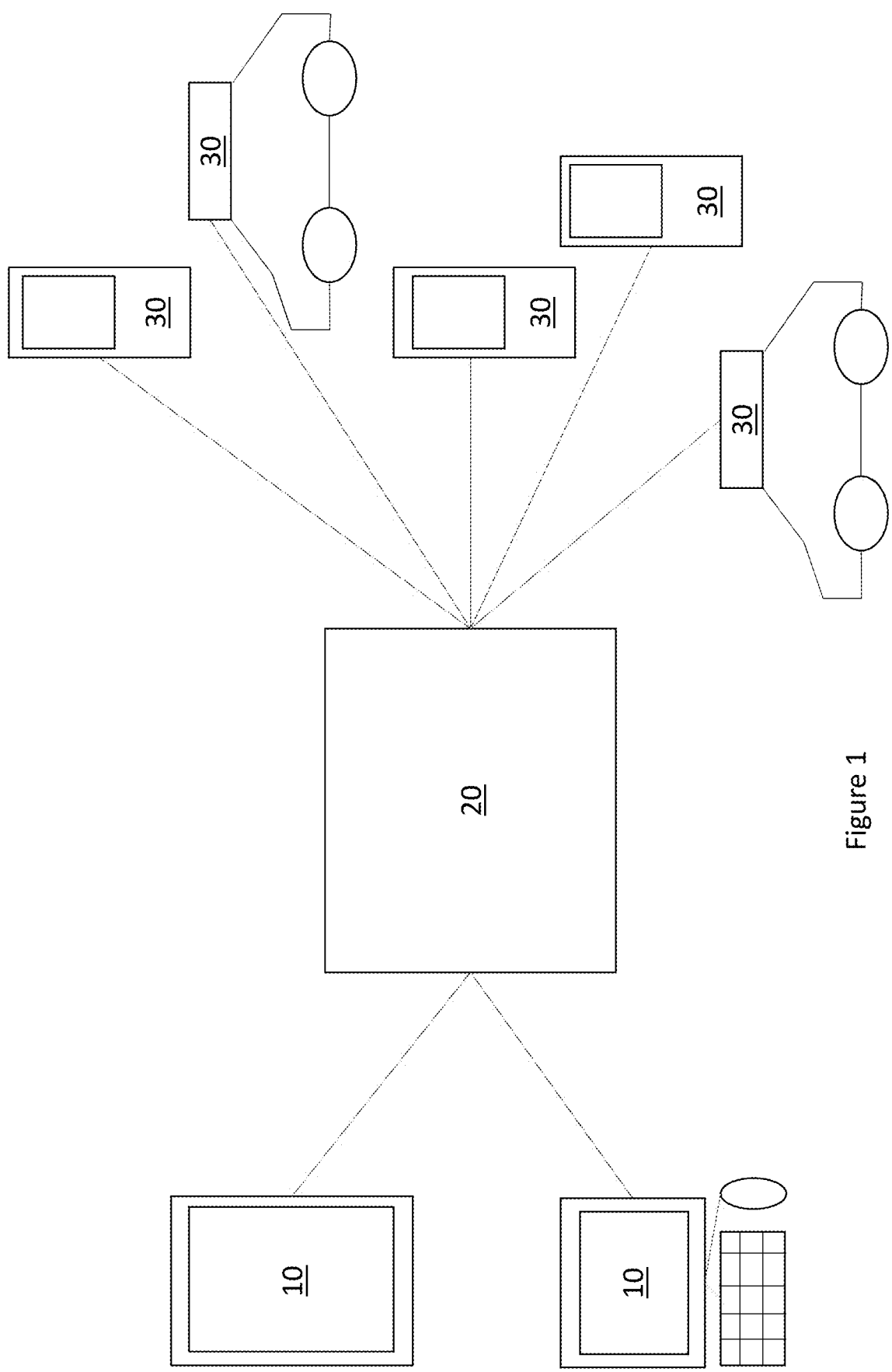
FIG. 1 is a simplified plan view of an exemplary system.

FIG. 1 is a simplified block diagram of an exemplary system. A number of display assemblies 30 may be in communication with a monitoring center 20. Similarly, a number of client devices 10 may be in communication with the monitoring center 20. The display assemblies 30 may be located remote from the monitoring center 20. Likewise, the client devices 10 may be located remote from the monitoring center 20. The communication between the display assemblies 30, the monitoring center 20, and the client devices 10 may be made by way of a network 80. The network 80 may be any network such as a cellular network, internet, intranet, world wide web, or the like. The network 80 between the client devices 10 and the monitoring center 20 may be the same or may be different from the network 80 between the monitoring center 20 and the display assemblies 30.

Each of the display assemblies 30 may be any kind of display assembly 30, such as but not limited to, a free-standing display kiosk configured for placement on a sidewalk, a wall-mounted display unit, a vehicle topper unit, or the like. Each of the client devices 10 may be a personal electronic device such as, but not limited to, a smartphone, tablet, smartwatch, laptop, desktop computer, some combination thereof, or the like.

Figure 2:
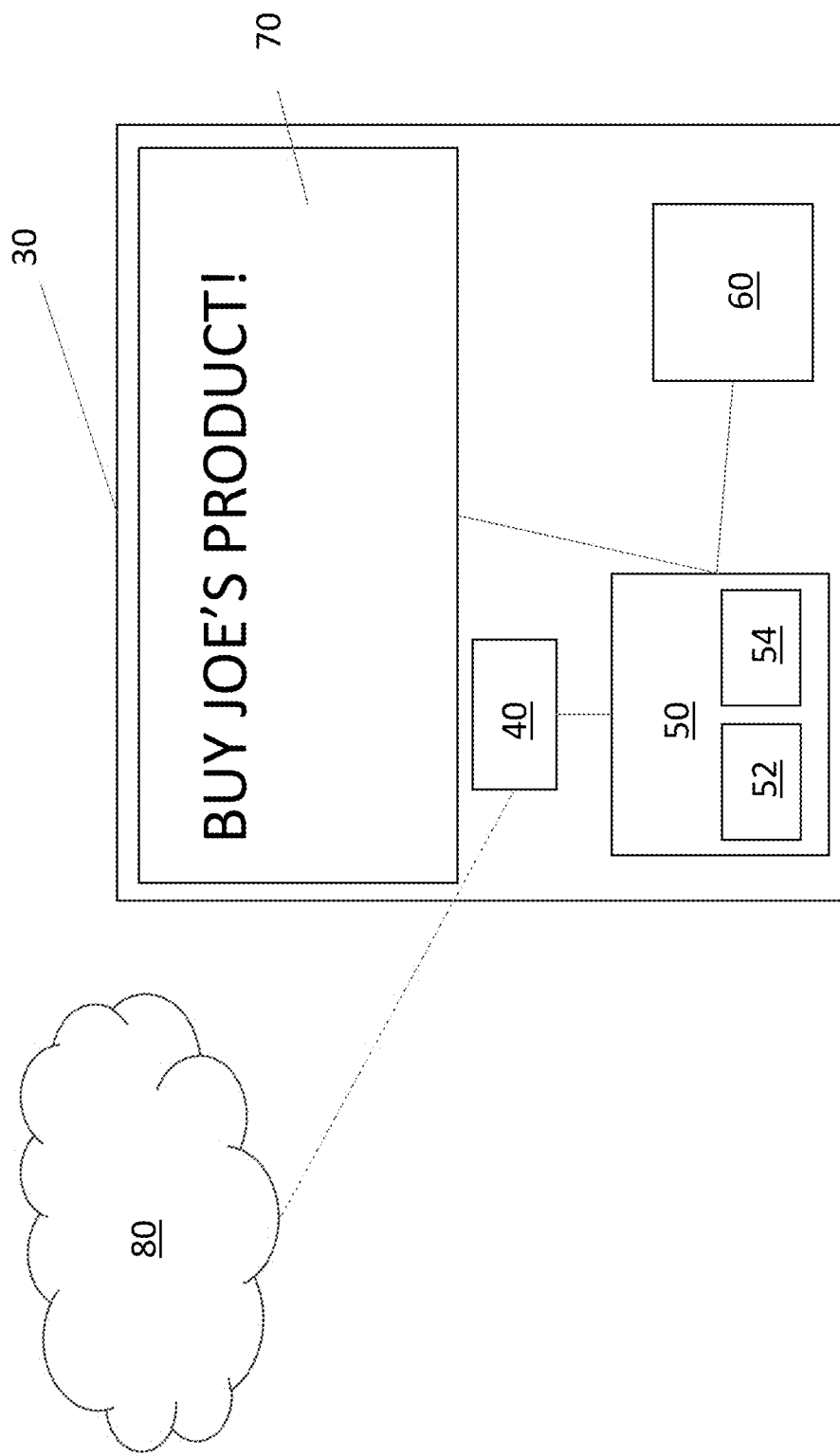
FIG. 2 is a detailed view of an exemplary display assembly of FIG. 1.

FIG. 2 is a detailed view of an exemplary display assembly 30 of FIG. 1. Each display assembly 30 may comprise one or more electronic displays 70 in electrical connection with a display controller 50. Each electronic display 70 may comprise a backlight for illuminating the electronic display 70. The electronic display 70 may comprise one or more a liquid crystal displays, light emitting diode ("LED") displays, organic LED displays, plasma displays, some combination thereof, or the like. One or more of the electronic displays 70 may comprise touch capabilities. The backlight may be comprised of a number of LEDs arranged in a directly backlit, edge-lit, or other orientation.

In exemplary embodiments, the display controller 50 may be in electrical connection with other components 60 for operating the display assembly 30. Such components 60 may include, but are not limited to, fans, temperature sensors, light sensors, fan speed sensors, power consumption, air quality sensors, weather sensors, other sensors, telephone equipment, video conferencing equipment, VOIP equipment, touch screens, camera, microphones, emergency notification devices, processors, electronic storage devices, wayfinding equipment, location detection devices, video players, proof of play devices, and the like. Any number, combination, and/or type of components are contemplated.

The display controller 50 may be configured to gather operations data from the electronic display 70. The display controller 50 may, alternatively or additionally, be configured to gather operations data from the components 60. Such operations data may include, but is not limited to, proof of play data, fan speed data, temperature data, humidity data, power consumption data, ambient light data, weather data, backlight data, electronic display data, status data, emergency notification data, air quality data, sensor readings, camera images or video recordings, microphone audio recordings, use history, and the like. The operations data for multiple clients may be co-located at the electronic storage device 52 located at the display assembly 30. Portions of the operations data may be associated with one or more client identifiers. For example, without limitation, operations data associated with a particular image displayed on the electronic display 70 may be associated with a particular client identifier. Alternatively, or in addition, all operations data originating from one or more display assemblies 30 may be associated with one or more client identifiers. This may permit for specific clients to access and retrieve only the operations data associated with the particular client—permitting the co-location of such operations data while maintaining privacy. The association with a client identifier may be performed at the display assembly 30 or at the monitoring center 20. The client identifiers may be, without limitation, unique alphanumeric serial numbers.

The display controller 50 may be in electrical communication with a network connection device 40. The network connection device 40 may be configured to transmit information to the monitoring center 20, including but not limited to, the operations data. In exemplary embodiments, the network connection device 40 may likewise be configured to receive information from the monitoring center 20, including but not limited to, operation instructions. Such operations instructions may comprise remote login capabilities, remote viewing, fan speed instructions, backlight adjustment instructions, video or image files for display on the electronic displays 70, some combination thereof, or other instructions for operation of the display assembly 30. The network connection device 40 may transmit and/or receive such information by way of the network 80.

The display controller 50 may comprise an electronic storage device 52 for storing the operations data and/or operations instructions. The display controller 50 may also comprise a processor 54 for processing the operations data and/or operations instructions. The electronic storage device 52 may comprise software instructions, which when executed, configure the processor 54 to perform various steps and processes described herein.

Figure 3:
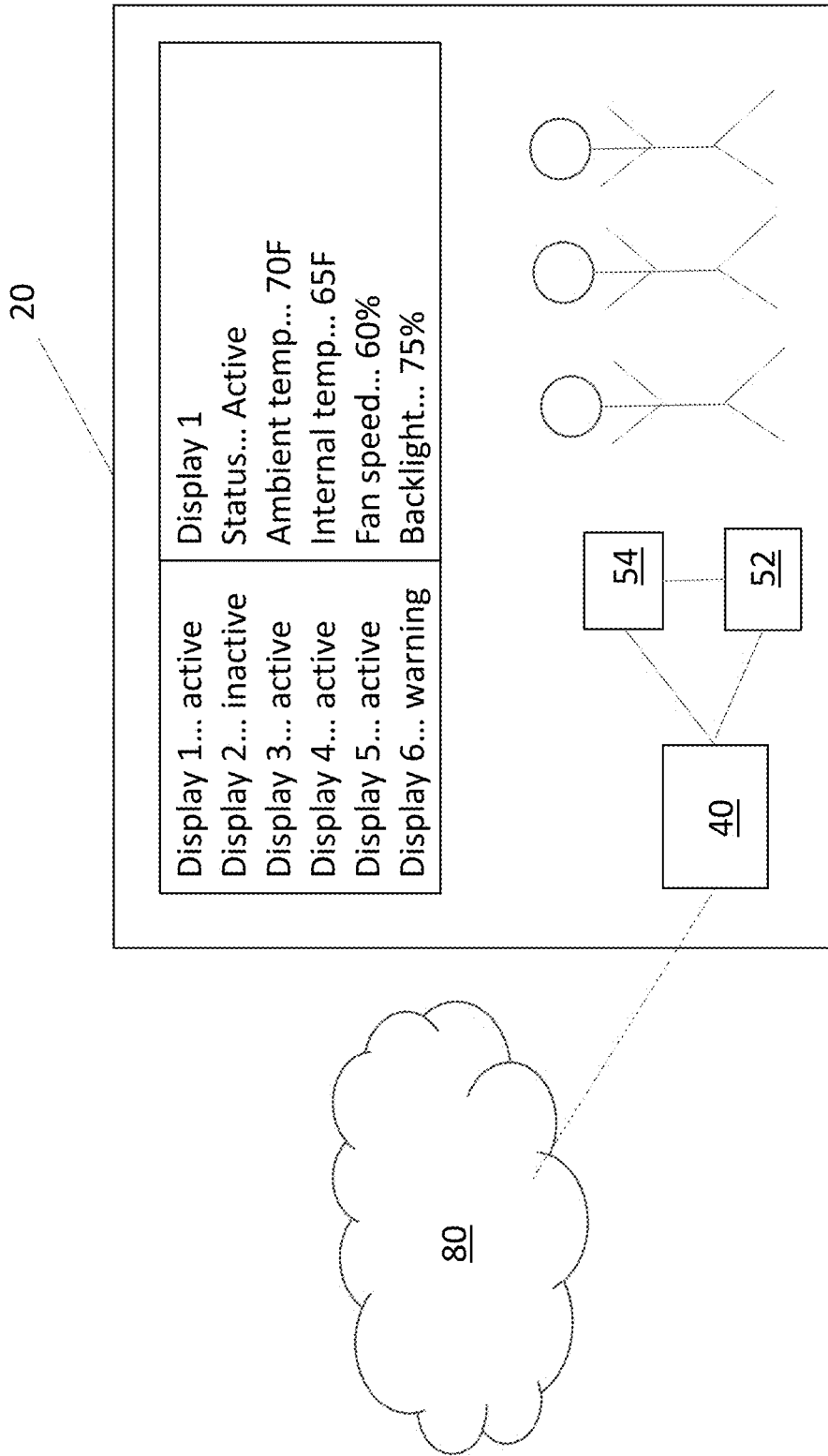
FIG. 3 is a detailed view of an exemplary monitoring center of FIG. 1.

FIG. 3 is a detailed view of an exemplary monitoring center 20 of FIG. 1. The monitoring center 20 may comprise an electronic storage device 52 for storing the operations data and/or operations instructions. The monitoring center 20 may also comprise a processor 54 for processing the operations data and/or operations instructions. The electronic storage device 52 may comprise software instructions, which when executed, configure the processor 54 to perform various steps and processes described herein. The processor 54 may be the same or different from the processor 54 of the display assembly 30.

The monitoring center 20 may further comprise a network connection device 40. The network connection device 40 may be in electrical communication with the processor 54 and the electronic storage device 52. The network connection device 40 may be in electrical communication with one or more of the display assemblies 30. The network connection device 40 may be configured to receive operations data from the one or more display assemblies 30. The network connection device 40 may also be configured to transmit operations instructions to one or more of the display assemblies 30.

The network connection device 40 may be receive the operations data and pass it to the electronic storage device 52 for storage. The operations data for multiple display assemblies 30 may be co-located at the electronic storage device 52 located at the monitoring center 20. Co-location may be accomplished by associating portions of the operations data with one or more client identifiers. Each portion of the operations data associated with a particular client identifier may be stored on a common electronic storage device 52, but electronically partitioned to ensure that the operations data associated with each particular client is maintained separate.

Alternatively, or in addition, all operations data originating from one or more display assemblies 30 may be associated with one or more client identifiers. This may permit for specific clients to access and retrieve only the operations data associated with the particular client—permitting the co-location of such operations data while maintaining privacy. The network connection device 40 may transmit and/or receive such operations data and/or operations instructions by way of the network 80.

The gathering, transmitting, storing, receiving, and retrieving of operations data and/or operations instructions as shown and described herein may be accomplished, wholly or in part, by the use of a microservices architecture. Any of the other steps or methods described herein may likewise be accomplished, wholly or in part, by the use of a microservices architecture.

The monitoring center 20 may be a brick-and-mortar location staffed with a number of monitoring personnel, though such is not required. In exemplary embodiments, the monitoring center 20 may comprise one or more rooms with one or more displays which may provide status and/or operations information for one or more display assemblies 30. For example, without limitation, a complete or partial list of display assemblies 30 and status information for each display assembly 30 may be shown. Information for a subset of display assemblies 30 may be shown in a rotating, scrolling, or other fashion. Detailed information regarding one or more display assemblies 30 may be shown on the same or a separate screen. A number of personal electronic devices, such as but not limited to, smartphone, tablet, smartwatch, laptop, desktop computer, some combination thereof, or the like may likewise display some or all of the information and may be configured to receive user input comprising operational instructions for one or more of the display assemblies 30.

Figure 4:
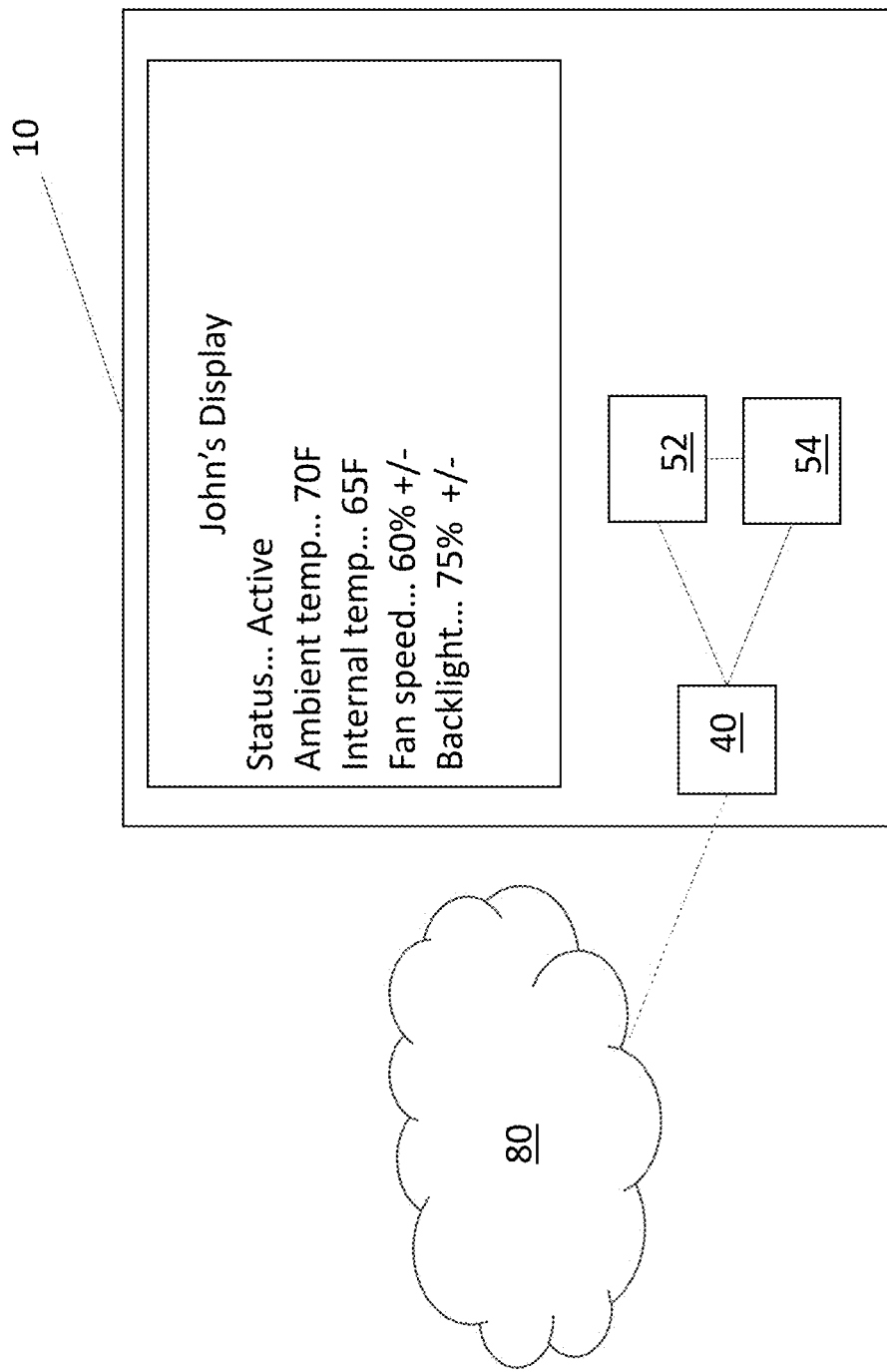
FIG. 4 is a detailed view of an exemplary client device of FIG. 1.

FIG. 4 is a detailed view of an exemplary client device 10 of FIG. 1. The client device 10 may be any personal electronic device, including but not limited to, a smartphone, tablet, smart watch, laptop, desktop computer, some combination thereof, or the like. The client device 10 may comprise an electronic storage device 52 for storing the operations data and/or operations instructions. The client device 10 may also comprise a processor 54 for processing the operations data and/or operations instructions. The electronic storage device 52 may comprise software instructions, which when executed, configure the processor 54 to perform various steps and processes described herein. The processor 54 may be the same or different from the processor 54 of the client device 10.

The client device 10 may further comprise a network connection device 40. The network connection device 40 may be in electrical communication with the processor 54 and the electronic storage device 52. The network connection device 40 may be in electrical communication with the monitoring center 20. The network connection device 40 may be configured to receive operations data from the one or more display assemblies 30 by way of the monitoring center 20. In exemplary embodiments, the network connection device 40 may be receive such operations data and store it on the electronic storage device 52. The network connection device 40 may be configured to transmit operations instructions to the monitoring center 20. The network connection device 40 may transmit and/or receive such information by way of the network 80. In exemplary embodiments, the receipt of operations data and/or transmission of operations instructions is accomplished by use of an internet browsing application and an internet-based user interface 90.

Figure 5:
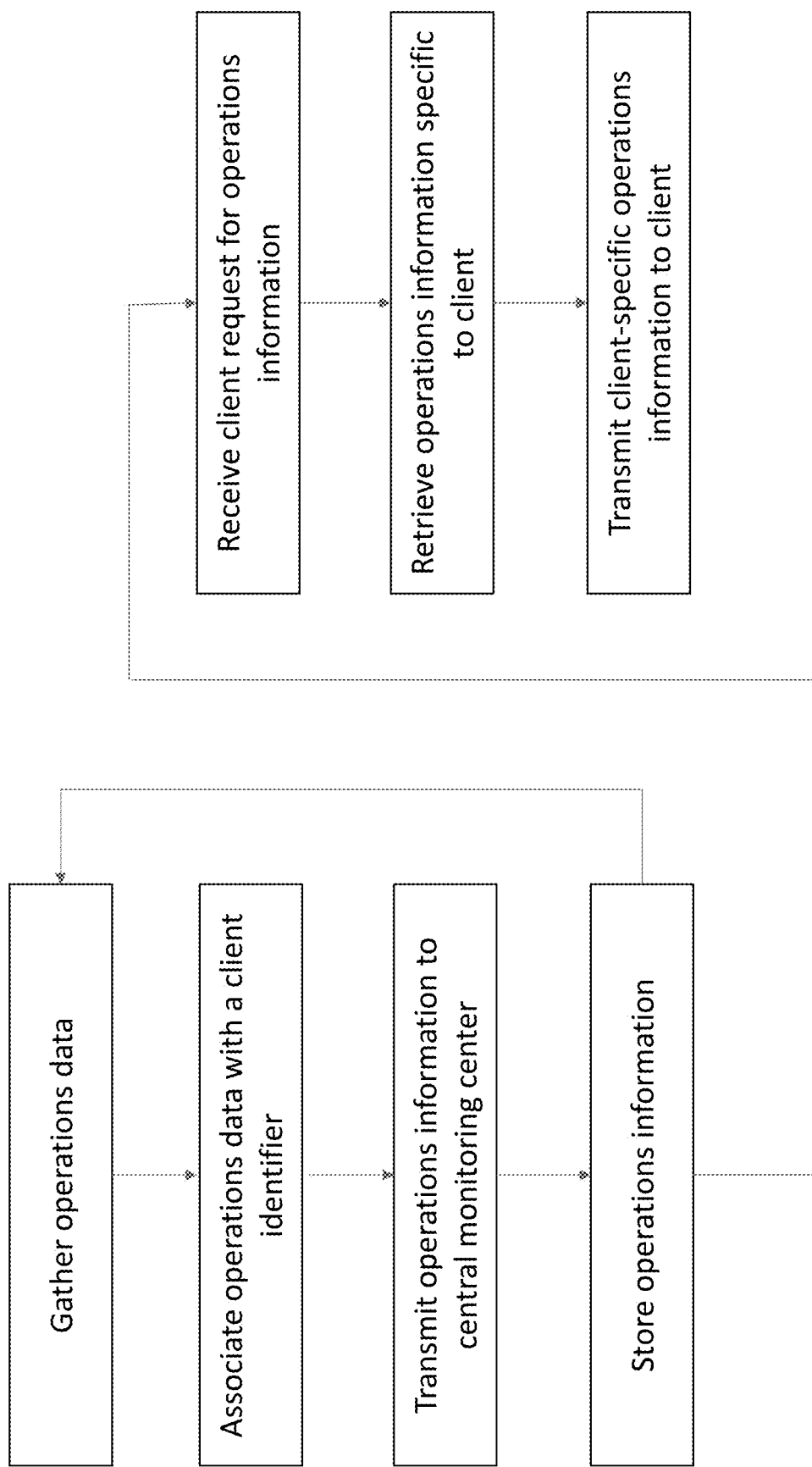
FIG. 5 is a flow chart of exemplary logic for use with the system of FIG. 1.

FIG. 5 is a flow chart of exemplary logic for use with the system of FIG. 1. The display controller 50 may gather operations data the one or more electronic displays 70 and/or the other components 60 of the respective display assembly 30. The operations data may be associated with one or more client identifiers. This operations data may be stored on the electronic storage device 52 of the respective display assembly 30. The operations data may be transmitted by way of the network connection device 40 and the network 80 to the monitoring center 20 where it may be stored on one or more electronic storage devices 52 at the monitoring center 20. In exemplary embodiments, the processor 54 at the monitoring center 20 may associate the operations data with one or more client identifiers. The processor 54 may electronically partition the electronic storage device 52 such that operations data associated with each particular client identifier is kept separate from operations data associated with other client identifiers. This process may be repeated continuously or at any interval. Alternatively, or in addition, a client identifier may be associated with the operations data when transmitted to the monitoring center 20.

A client request for operations data may be received from one or more of the client devices 10 at the monitoring center 20. The monitoring center 20 may retrieve the operations data associated with the client. In exemplary embodiments, this may involve retrieving all operations data associated with one or more of the display assemblies 30 associated with the client. Alternatively, or in addition, operations data specific to the client from a particular display assembly 30 may be retrieved. Stated another way, any single display assembly 30 may comprise operations data for multiple clients and only the operations data specific to the particular client may be retrieved. The retrieved operations data specific to the client may then be transmitted to the appropriate client device(s) 10. In exemplary embodiments, data specific to the client may be identified by way of the client identifiers. Operations data may be requested from each electronic display assembly 30 periodically, continuously, sequentially, in a particular order, some combination thereof, or the like.

Figure 6:
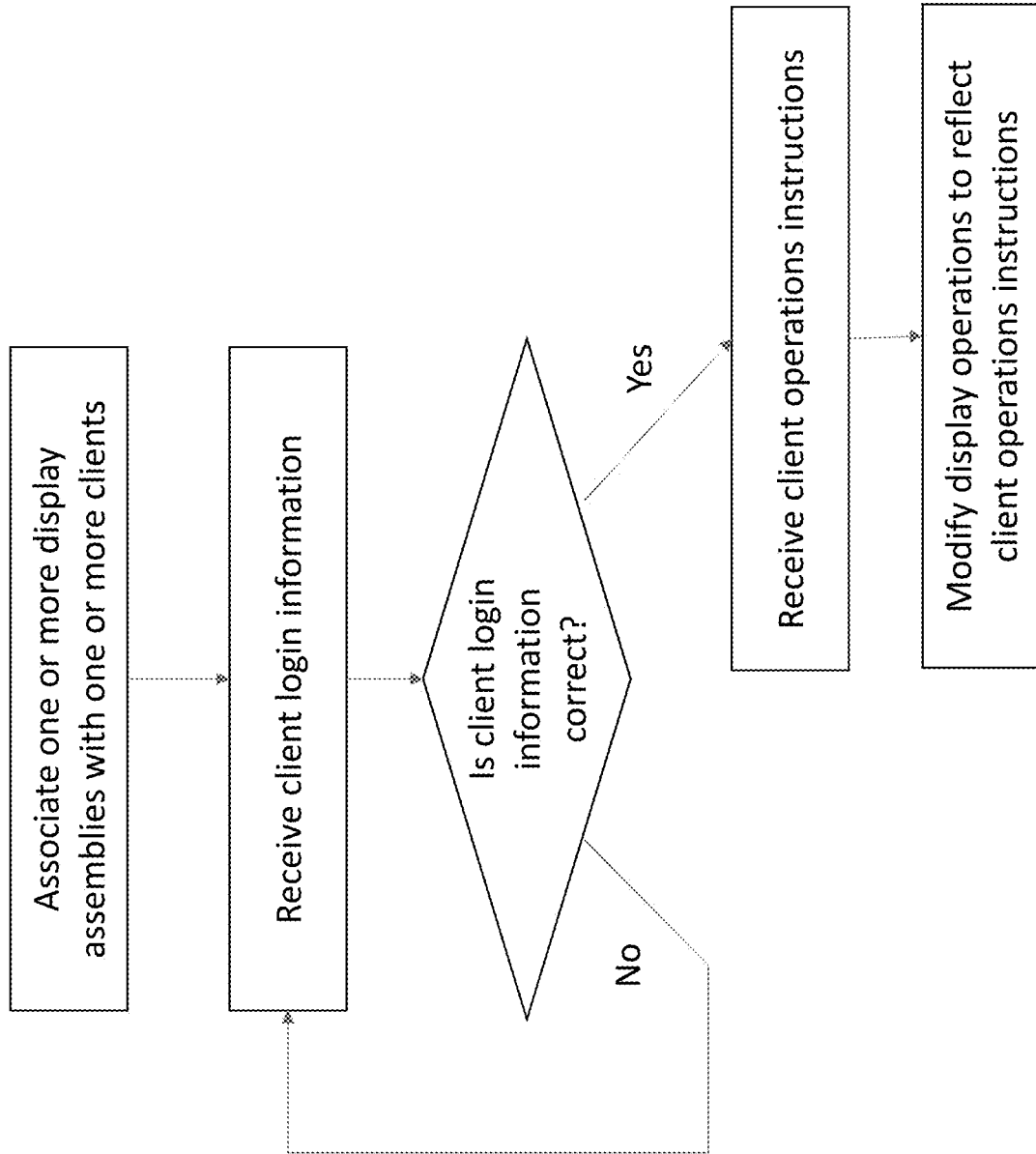
FIG. 6 is a flow chart of other exemplary logic for use with the system of FIG. 1.

FIG. 6 is a flow chart of other exemplary logic for use with the system of FIG. 1. One or more display assemblies 30 may be associated with one or more clients. A client login request may be received by way of one or more client devices 10 at the monitoring center 20. If the client login is not successful (e.g., if the user name and/or password are incorrect) the request may be denied. If the client login is successful (e.g., the user name and password are correct) the client may be permitted to remotely access one or more display assemblies 30 associated with the client. In exemplary embodiments, client login may be made by way of user name and password, one time use codes, biometric information, some combination thereof, or the like. Any method or system for verifying client identity is contemplated. Such access may be made by way of the monitoring center 20. The client may be able to view and retrieve operations data for the one or more display assemblies 30 associated with the client. The client may also be permitted to submit operation instructions for the one or more display assemblies 30 associated with the client. The operations of the one or more display assemblies 30 associated with the client may then be modified to reflect the received client operation instructions. Permissions may be tailored on a per client basis such that only certain display assemblies 30 may be accessed and/or modified when particular client login information is provided.

Figure 7:
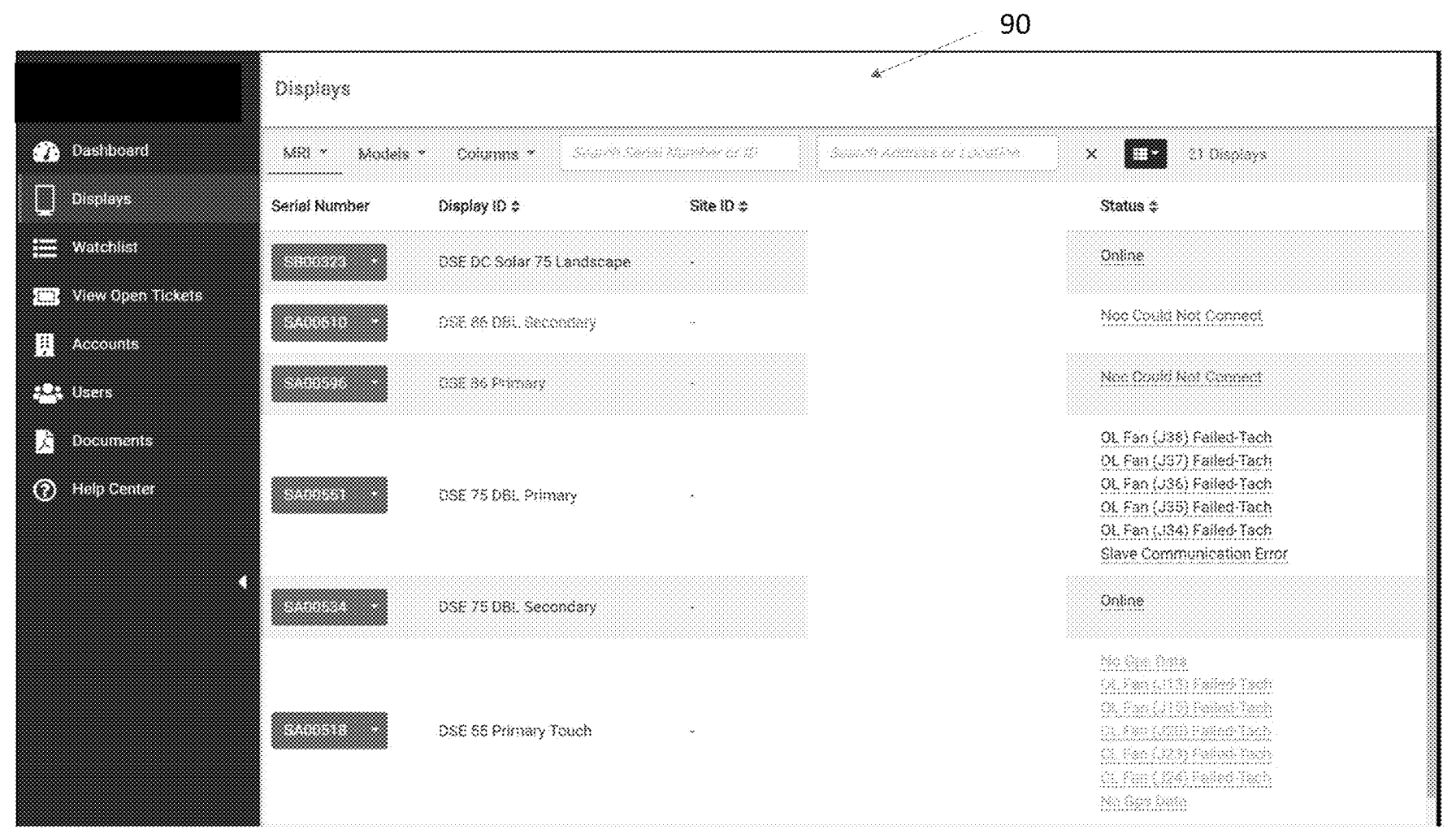

FIG. 7 is an exemplary user interface 90 for use with the system of FIG. 1. The user interface 90 may display overview information regarding a number of display assemblies 30, each of which may be associated with a particular client though such is not required. Information about each display assembly 30 may include, but is not limited to, the serial number, description information, site information, and status information of each display assembly 30. Status information, current and/or historical, may also be provided.

Figure 8:
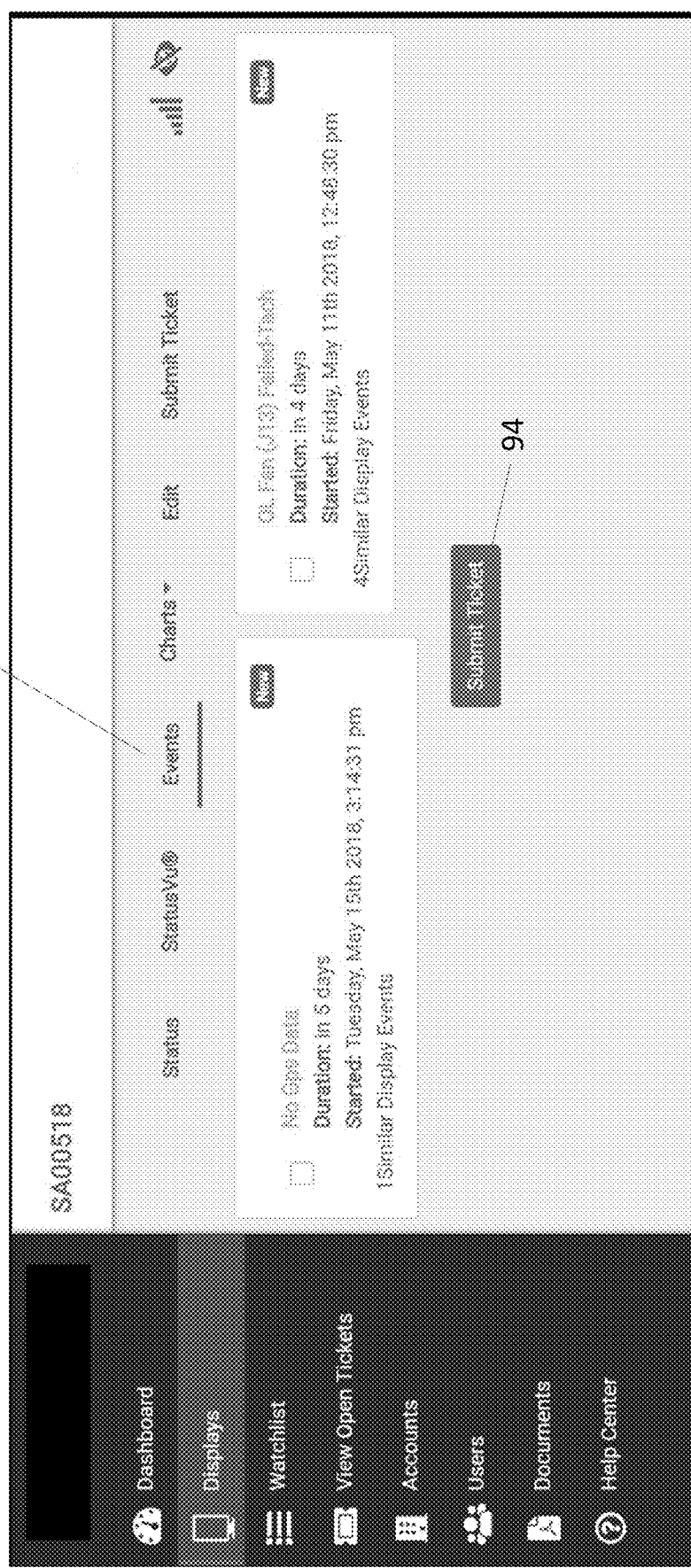
FIG. 8 is another exemplary user interface for use with the system of FIG. 1.

As shown in FIG. 8, event information for each of the display assemblies 30 associated with a particular client may be depicted under an events tab 92. The event information may include, but is not limited to, errors and warnings associated with one or more particular display assemblies 30. An option to automatically generate a repair request ticket 94 may be provided for each event.

Figure 9:
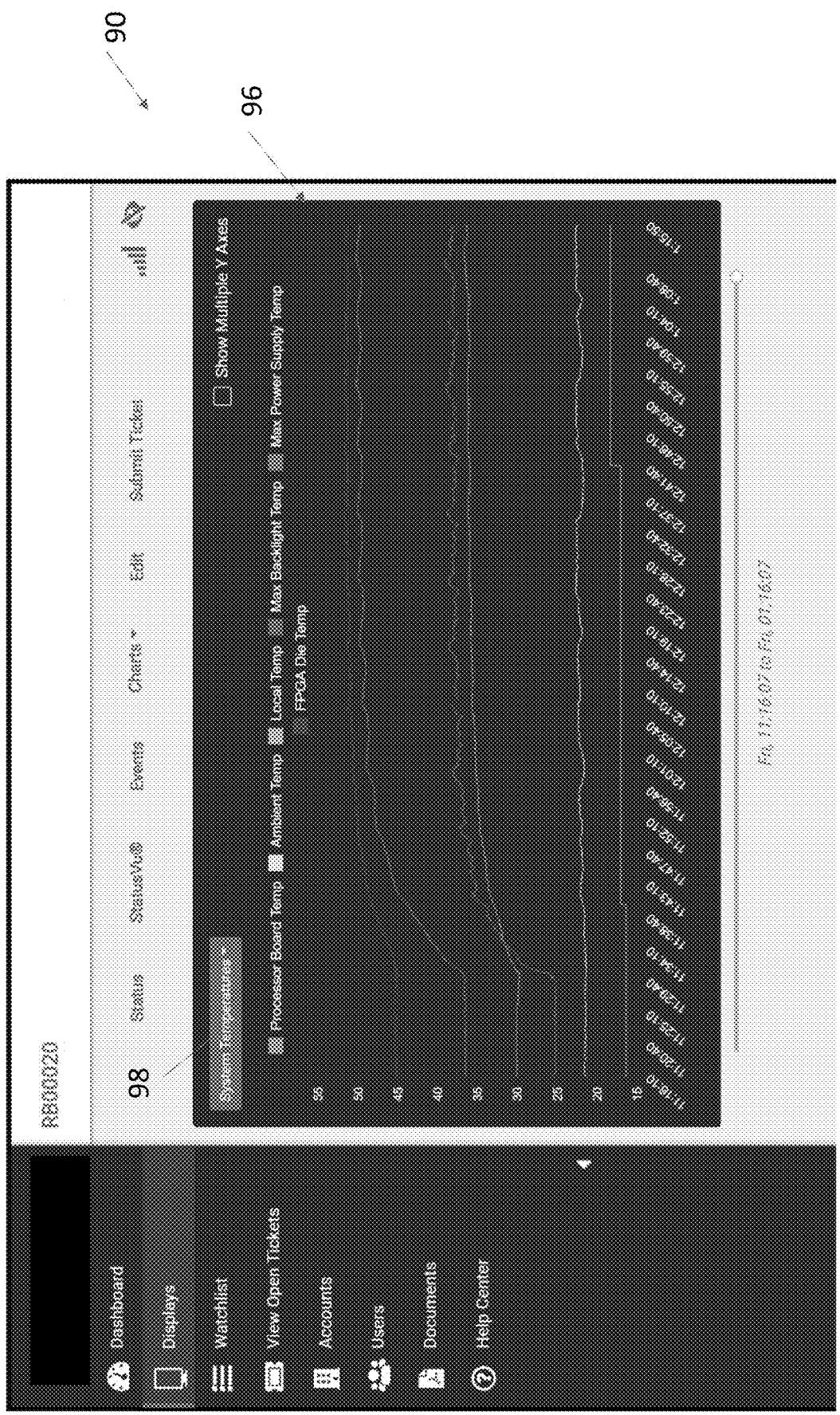
FIG. 9 is another exemplary user interface for use with the system of FIG. 1.

FIG. 9 is another exemplary user interface 90 for use with the system of FIG. 1. A visualization 96 of current and historical operations data may be displayed. Such operations data may comprise data from one or more sensors associated with a display assembly 30. In exemplary embodiments, the visualization 96 may be displayed in tabular form or a graphical representation such as, but not limited to, a line chart, bar chart, scatter diagram, or the like. Various categories of data may be depicted in the visualization 96 as selected by use of a menu 98. Such categories may be displayed in a color-coded fashion.

Figure 10:
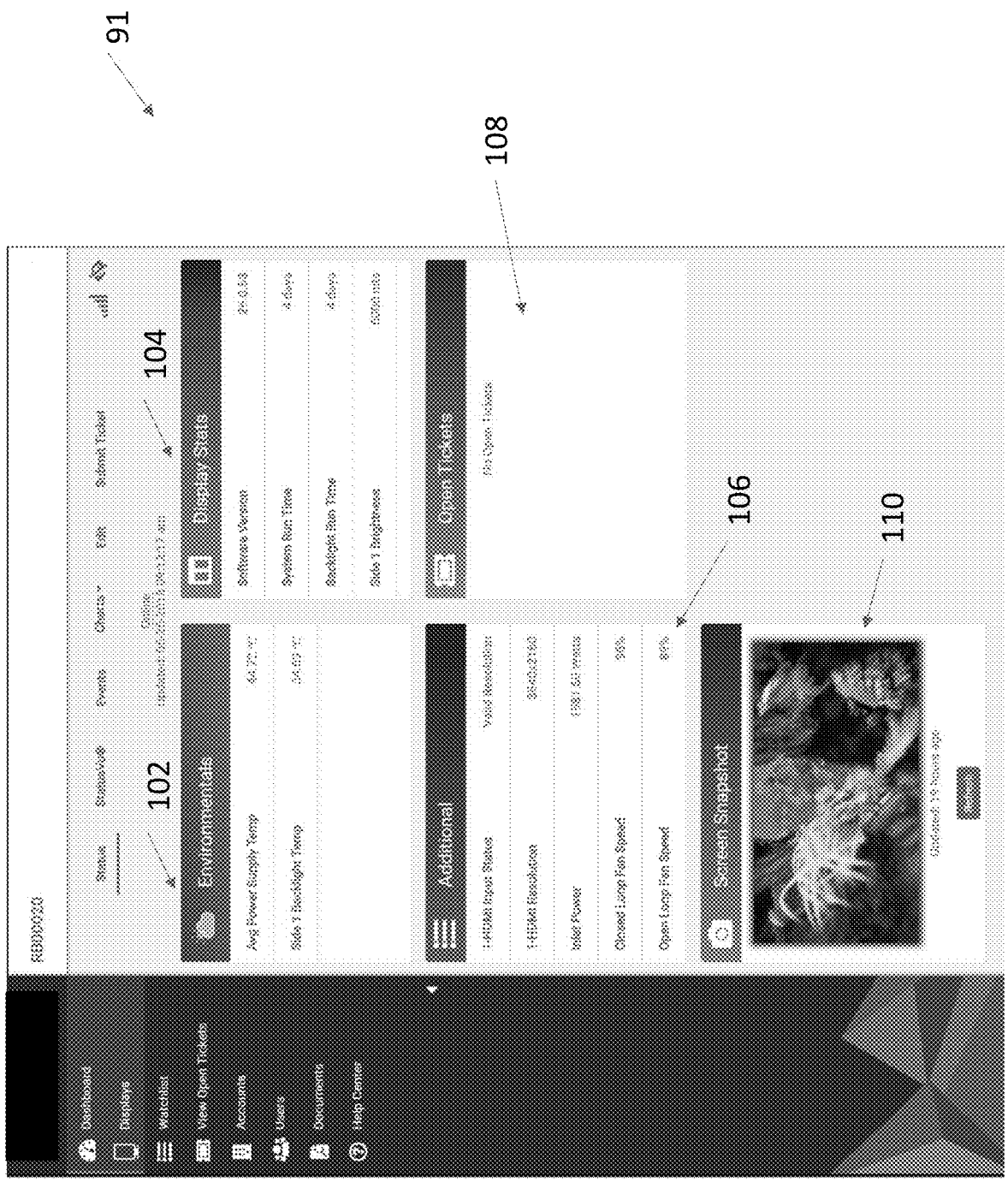
FIG. 10 is another exemplary user interface for use with the system of FIG. 1.

FIG. 10 is an exemplary summary dashboard 91, which may be configured to display summary information regarding a particular display assembly 30. Environmental information 102 may be displayed such as, but not limited to, the average power supply temperature and average backlight temperature. Display status information 104 may also be displayed such as, but not limited to, the software version, the system run time, the backlight run time, and the brightness of each display. Additional information 106 may also be displayed such as, but not limited to, the status and resolution of various inputs, the inlet power supply, and the fan speed of various fans in the display assembly 30. Any open repair request tickets may be displayed at an open ticket information area 108. A screen capture 110 of what is currently being displayed, was previously displayed, and/or is scheduled to be displayed next on the display assembly 30 may also be provided.

Figure 11:
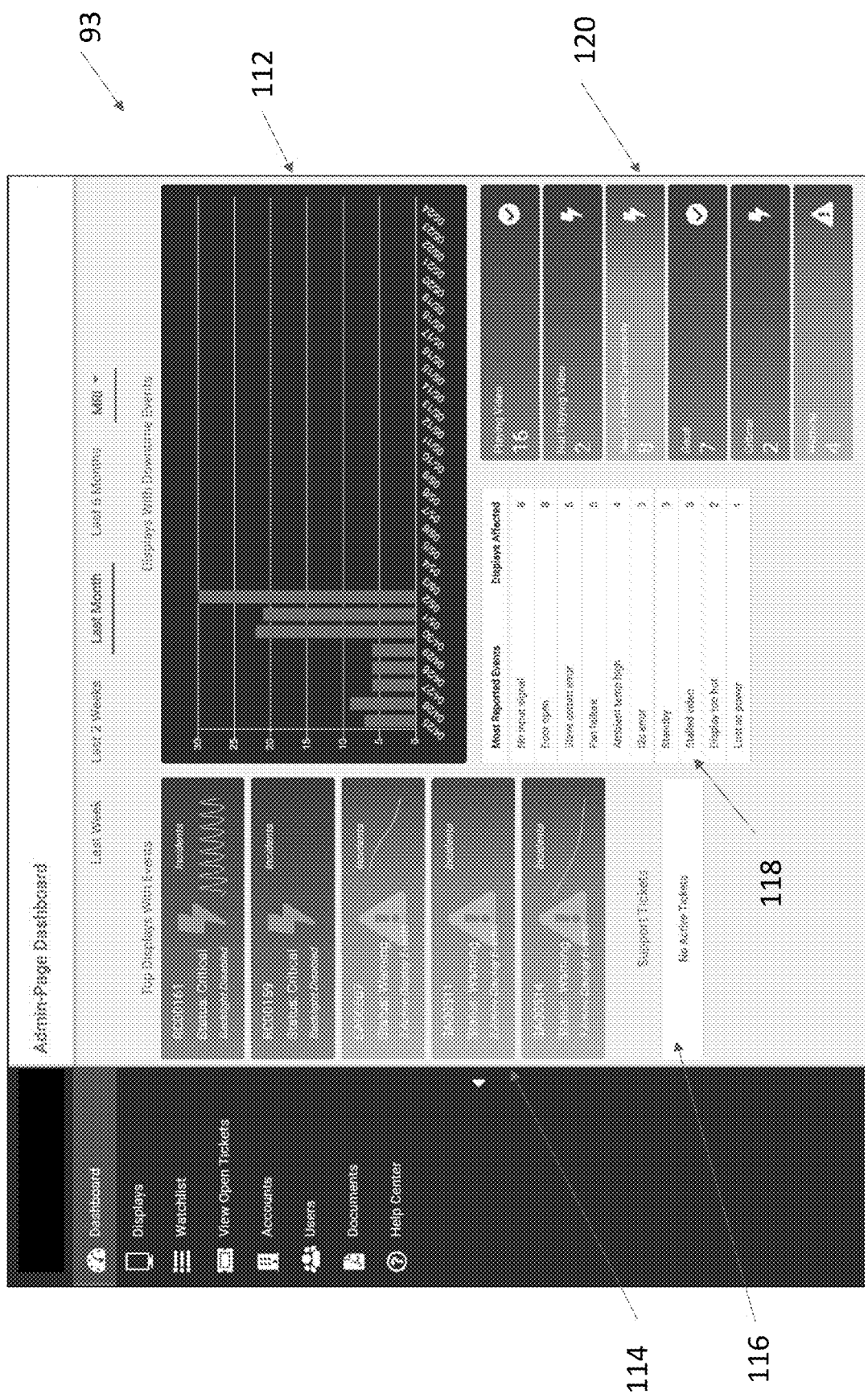
FIG. 11 is another exemplary user interface for use with the system of FIG. 1.

FIG. 11 is another exemplary summary dashboard 93, which may be configured to display summary information regarding all display assemblies 30 associated with a particular client identifier. The number of display assemblies 30 with some downtime event may be depicted in a downtime visualization 112. In exemplary embodiments, the downtime visualization 112 is a bar graph tracked by date, though any form of visualization is contemplated. A listing of top display assemblies with events 114 may be provided. A summary of repair ticket requests 116 may also be provided depicting all open repair ticket requests. A summary of the most reported events 118 may list the event(s) in question and the number of display assemblies 30 affected by the given event(s). The summary of the most reported events 118 may be presented in tabular form, though such is not required. Finally, a status summary 120 of all display assemblies 30 associated with a given client identifier may be provided. The status summary 120 may include, but is not limited to, the number of display assemblies 30 associated with the given client identifier which are playing video, not playing video, having no or limited network connectivity, in good condition, in critical condition, or having one or more warning events.

The information displayed and the manner in which it is displayed is merely exemplary and is not intended to be limiting. It is contemplated that any kind of data may be displayed in any format.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

Certain operations described herein may be performed by one or more electronic devices. Each electronic device may comprise one or more processors, electronic storage devices, executable software instructions, and the like configured to perform the operations described herein. The electronic devices may be general purpose computers or specialized computing device. The electronic devices may be personal computers, smartphone, tablets, databases, servers, or the like. The electronic connections described herein may be accomplished by wired or wireless means.

What is claimed is:

1. A system for providing access to co-located operations data for a number of different clients for utilizing an electronic display assembly, said system comprising:
   one or more databases configured to receive operations data from one or more sensors at the electronic display assembly; and
   one or more servers configured to:
   assign each portion of said operations data received at said one or more databases from said electronic display assembly one of a number of client identifiers such that at least one portion of said operations data is assigned a different one of the number of client identifiers from another portion of said operations data;
   electronically partition the operations data at said one or more databases by the assigned client identifiers;
   receive login information from a client device, wherein said received login information comprises a particular one of the client identifiers;
   verify said received login information;
   query the one or more databases to retrieve all of the portions of the operations data assigned the particular one of the client identifiers; and transmit the retrieved portions of the operations data to the client device.

2. The system of claim 1 wherein:
said one or more servers are configured to summarize said retrieved portion of the operations data into a summary report prior to transmission to said client device such that said retrieved portions of said operations data are transmitted in the form of said summary report.

3. The system of claim 1 wherein:
electronic communication between the one or more servers, the one or more databases, and the electronic display assembly is made by way of a network.

4. The system of claim 1 wherein:
said operations data comprises one or more of fan speed, ambient temperature readings, internal temperature readings, ambient light levels, backlight levels, and power consumption information.

5. The system of claim 1 wherein:
said operations data comprises at least one image displayed at said electronic display assembly.

6. The system of claim 1 wherein:
said one or more servers are configured to:
receive updated operation instructions; and
transmit said updated operations instructions to the electronic display assembly.

7. The system of claim 6 wherein:
said updated operation instructions comprise one or more of fan speed instructions and backlight level instructions for the electronic display assembly.

8. The system of claim 2 wherein:
said operations data comprises one or more of status information and event information for the electronic display assembly; and
said summary report comprises one or more of said status information and said event information for the electronic display assembly.

9. The system of claim 8, wherein:
said operations data comprises one or more of fan speed, ambient temperature readings, internal temperature readings, ambient light levels, and backlight levels for the electronic display assembly; and
said summary report comprises a visual depiction of one or more of said fan speed, ambient temperature readings, internal temperature readings, ambient light levels, and backlight levels for the electronic display assembly.

10. The system of claim 9 wherein:
said visual depiction comprises a line graph.

11. The system of claim 1 wherein:
said one or more databases are configured to receive operations data from a number of additional electronic display assemblies; and
said one or more servers are configured to assign one of said number of client identifiers to each portion of operations data received at said one or more databases from each of said number of additional electronic display assemblies.

12. The system of claim 11 wherein:
said one or more databases and said one or more servers are located at a network operations center remote from said electronic display assembly and each of said number of additional electronic display assemblies.

13. A method for providing access to co-located operations data for a number of different clients utilizing an electronic display assembly, said method comprising the steps of:

receiving, at one or more databases, operations data from one or more sensors at the electronic display assembly;
assigning each portion of said operations data one of a number of client identifiers, wherein at least two portions of said operations data are assigned different ones of said number of client identifiers;
electronically partitioning the operations data at said one or more databases by the assigned client identifiers;
receiving login information from a requesting client device;
verifying said received login information;
receiving an operations data request from said requesting client device comprising a particular one of the number of client identifiers;
retrieving, from the one or more databases, said operations data associated with the particular one of the number client identifiers;
transmitting the operations data retrieved from the one or more databases to the requesting client device;
receiving updated operation instructions from said requesting client device; and
transmitting said updated operations instructions to the electronic display assembly.

14. The method of claim 13 further comprising the steps of:
summarizing said operations data retrieved from the one or more database into a summary report prior to transmitting to said requesting client device such that said operations data is transmitted in the form of said summary report.

15. The method of claim 13 further comprising the steps of:
receiving, at said one or more databases, operations data from a number of additional electronic display assemblies; and
assigning a respective one of the number of client identifiers to all portions of said operations data received from a respective one of said number of additional electronic display assemblies.

16. The method of claim 15 wherein:
said one or more databases and said one or more servers are located at a network operations center remote from said electronic display assembly and each of said number of additional electronic display assemblies.

17. A system for providing access to co-located operations data for a number of different users of an electronic display assembly, said system comprising:
one or more databases configured to receive operations data from one or more sensors at the electronic display assembly; and
one or more servers configured to:
assign each portion of said operations data received at said one or more databases from said electronic display assembly one of a number of client identifiers, wherein said client identifiers are specific to said users such that at least one portion of said operations data received for said electronic display assembly is assigned a different one of the number of client identifiers from another portion of said operations data received for said electronic display assembly;
electronically partition the operations data at said one or more databases by the assigned client identifiers;
following receipt of a request from a client device comprising a particular one of the client identifiers associated with a particular one of the users, query the one or more databases to retrieve all of the portions of the operations data assigned the particular one of the client identifiers; and transmit the retrieved portions of the operations data to the client device.

18. A method for providing access to co-located operations data for a number of different users of an electronic display assembly, said method comprising the steps of:

receiving, at one or more databases, operations data from one or more sensors at the electronic display assembly;

assigning each portion of said operations data one of a number of client identifiers, wherein said client identifiers are specific to said users such that at least two portions of said operations data for said electronic display assembly are assigned different ones of said number of client identifiers;

electronically partitioning the operations data at said one or more databases by the assigned client identifiers;

receiving an operations data request from a requesting client device associated with a particular one of the users comprising a particular one of the number of client identifiers;

retrieving, from the one or more databases, said operations data associated with the particular one of the number gf client identifiers; and transmitting the operations data retrieved from the one or more databases to the requesting client device.

* * * * *